W. GRETSINGER.
PAINTER'S BLOWTORCH.
APPLICATION FILED OCT. 26, 1920.
1,380,140. Patented May 31, 1921.
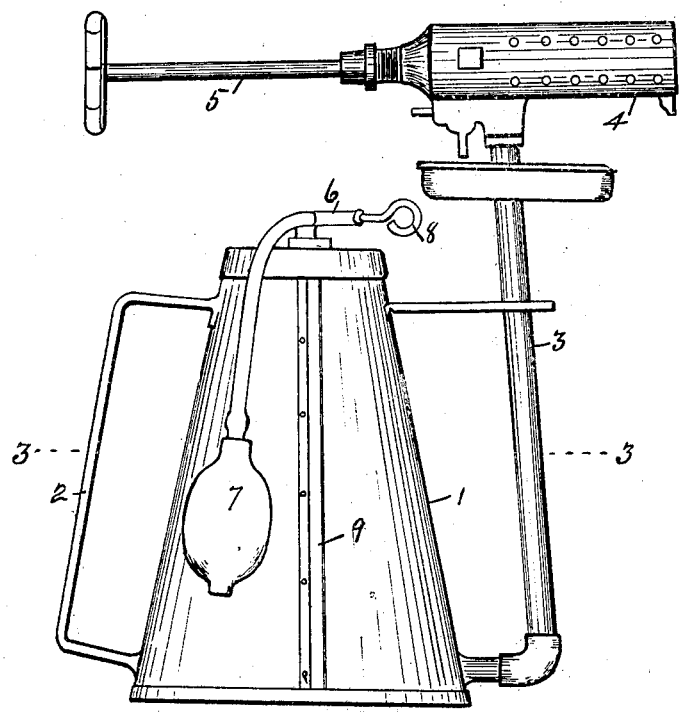
Fig 1.
Fig 2.
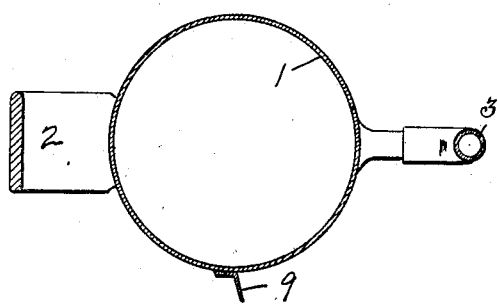

UNITED STATES PATENT OFFICE.

WILLIAM GRETSINGER, OF BALTIMORE, MARYLAND.

PAINTER'S BLOWTORCH.

1,380,140.  Specification of Letters Patent.  Patented May 31, 1921.

Application filed October 26, 1920. Serial No. 419,717.

*To all whom it may concern:*

Be it known that I, WILLIAM GRETSINGER, a citizen of the United States, residing at Baltimore, in the State of Maryland, have invented certain new and useful Improvements in Painters' Blowtorches, of which the following is a specification.

This invention relates to improvements in painter's blow torch, and has for its object to provide a simple and efficient means on the side of the torch for removing paint from the knife used in scraping same from the surface after it has been burned.

The invention consists of the novel construction and arrangement of the parts hereinafter set forth in the following specification and pointed out in detail in the appended claims.

In the accompanying drawings:—

Figure 1 is a side elevation of my invention.

Fig. 2 is a section on the line 3—3 of Fig. 1.

Referring to the accompanying drawings forming part of this specification, and in which like reference numerals designate like parts throughout the several views thereof, 1 designates the gasolene holder which is provided with a handle 2 on one side and a pipe 3 on the opposite side leading from the bottom of said holder to the burner 4. Said burner 4 is provided with a valve 5 to regulate the flow of gasolene to the burner 4. The said gasolene holder 1 is provided with an air pipe 6 and a bulb 7 to force the air into said holder, said pipe 6 is provided with a valve 8 to open or close communications between the bulb 7 and said pipe 6. Extending vertically along the side of the gasolene holder 1 on the outer surface thereof is a laterally projecting blade or scraper 9 against which the knife being being used to remove the burnt paint is scraped for the purpose of removing the paint from the knife.

Having thus described my invention what I claim is,

1. A blow torch comprising a gasolene holder, a burner, a pipe leading from said gasolene holder to said burner, and a blade projecting vertically along the outer surface of said gasolene holder.

2. A blow torch comprising a gasolene holder, having a handle on one side thereof, and a scraping-blade extending vertically along the outer surface of said gasolene holder.

In testimony whereof I affix my signature.

WILLIAM GRETSINGER.